US009857249B2

(12) United States Patent
Barr (10) Patent No.: US 9,857,249 B2
(45) Date of Patent: Jan. 2, 2018

(54) TENSIONER LOAD MEASUREMENT SYSTEM

(71) Applicant: Transocean Sedco Forex Ventures Limited, George Town Grand Cayman (KY)

(72) Inventor: Aaron Barr, Houston, TX (US)

(73) Assignee: Transocean Sedco Forex Ventures Limited (KY)

( * ) Notice: Subject to any disclaimer, the term of this patent is extended or adjusted under 35 U.S.C. 154(b) by 707 days.

(21) Appl. No.: 13/844,197

(22) Filed: Mar. 15, 2013

(65) Prior Publication Data

US 2014/0278153 A1 Sep. 18, 2014

(51) Int. Cl.
*G01L 1/24* (2006.01)

(52) U.S. Cl.
CPC ................... *G01L 1/246* (2013.01)

(58) Field of Classification Search
CPC ........................................ G01L 1/246
USPC ............................................. 702/42
See application file for complete search history.

(56) References Cited

U.S. PATENT DOCUMENTS

| | | | | | |
|---|---|---|---|---|---|
| 5,182,779 | A | * | 1/1993 | D'Agostino | D07B 1/145 385/13 |
| 5,563,967 | A | * | 10/1996 | Haake | G01B 11/18 250/227.14 |
| 5,973,317 | A | * | 10/1999 | Hay | G01B 11/18 250/227.14 |
| 2005/0100414 | A1 | * | 5/2005 | Salama | E21B 17/01 405/224.2 |
| 2010/0329602 | A1 | * | 12/2010 | Shah | G01D 5/35303 385/13 |
| 2011/0110620 | A1 | * | 5/2011 | Childers | E21B 47/0006 385/13 |
| 2011/0178730 | A1 | * | 7/2011 | Mangal | E21B 17/017 702/43 |
| 2012/0051175 | A1 | * | 3/2012 | Sudow | G01V 1/3835 367/19 |
| 2012/0143521 | A1 | * | 6/2012 | Chen | G01L 1/246 702/42 |
| 2012/0143522 | A1 | * | 6/2012 | Chen | G01L 1/246 702/42 |
| 2012/0143523 | A1 | * | 6/2012 | Chen | G01L 1/246 702/42 |
| 2012/0143524 | A1 | * | 6/2012 | Chen | G01L 1/246 702/42 |
| 2012/0143525 | A1 | * | 6/2012 | Chen | G01M 5/0025 702/42 |

* cited by examiner

*Primary Examiner* — Manuel L Barbee
*Assistant Examiner* — Raymond Nimox
(74) *Attorney, Agent, or Firm* — Norton Rose Fulbright US LLP (57) ABSTRACT

A load and stress of a tensioner may be determined from the change in the strain of the tensioner. The strain of the tensioner may be detected by an optical device having a Fiber Bragg Grating (FBG) that is attached to the tensioner. An electrical signal may be generated in response to the detected change in the mechanical strain of the tensioner by processing the light reflected from an optical fiber coupled to the optical device. The electrical signal may be processed to calculate a load on the tensioner. The calculated load may be stored and analyzed, along with previously-stored values for the load, to determine the condition of the tensioner system, and whether the tensioner system requires maintenance.

12 Claims, 11 Drawing Sheets

TENSIONER LOAD MEASUREMENT SYSTEM

TECHNICAL FIELD

The instant disclosure relates to marine drilling. More specifically, this disclosure relates to marine riser tensioners.

BACKGROUND

Floating offshore drilling vessels include system for compensating for movement of the vessel relative to a stationary well. One component of this system includes a marine riser tensioner. The tensioner applies a force on the drilling riser to manage differences in movement between the drilling riser and the vessel.

Marine riser tensioners on drilling vessels frequently experience load variations due to excessive friction on the tensioners. Conventional systems have attempted to measure the load variations with cylinder pressure transducers. However, the load variations often go unmeasured or undetected by cylinder pressure transducers, which result in mechanical failures elsewhere. For example, undetected load variations may lead to rod-seal-carrier-bolt failure due to excessive rod-to-rod seal-carrier friction loads. As a consequence, a large amount of drilling vessel non-productive time may be experienced while repairing failures that result from undetected load variations.

Furthermore, the data received using cylinder pressure transducers does not include information related to friction, nor does it fully describe normal tension variations during routine operations. The absence of this information and the means to observe it increases the difficulty in knowing when to service or exchange the cylinder.

BRIEF SUMMARY

Strain on the tensioner may be measured by attaching sensors to the tensioner. The sensors may be an optical device, such as a Fiber Bragg Grating (FBG). A light source may be coupled to the optical device to transmit light and receive reflected light from the optical device. A change in wavelength between the transmitted light and the reflected light may be proportional to a strain on the tensioner. From the strain, stress and load may be calculated for the tensioner. Historical data regarding the strain, stress, and load values may be stored. A condition of the tensioner may be determined from the strain, stress, and/or load historical data. Furthermore, a predictive model may predict failures of the tensioner based on the historical data.

According to one embodiment, a method may include transmitting a light signal into an optical device attached to a tensioner. The method may also include receiving a reflected signal from the optical device attached to the tensioner. The method may further include determining a change of wavelength in the reflected signal. The method may also include calculating a strain on the tensioner at the optical device based, at least in part, on the change in wavelength.

In certain embodiments, the method may include transmitting a light signal into a Fiber Bragg Grating (FBG) attached to the tensioner; receiving a reflected signal from the Fiber Bragg Grating attached to the tensioner; calculating a stress based, at least in part, on the calculated strain; calculating a load based, at least in part, on the calculated strain; the calculated load may include at least one of an axial load on the tensioner, a bending load on the tensioner, and a torsional load on the tensioner; storing the calculated tensioner load; calculating a condition value representative of the stored tensioner load and at least one previously-stored tensioner load; comparing the condition value to a threshold; determining the condition of the tensioner based, at least in part, on the result of the comparison step; transmitting a second light signal into a second optical device attached to a tensioner; receiving a second reflected signal from the second optical device attached to the tensioner; determining a second change of wavelength between the second light signal and the second reflected signal; calculating a second strain on the tensioner at the second optical device based, at least in part, on the second change in wavelength; and/or calculating a load on the tensioner based, at least in part, on the first strain and the second strain.

According to another embodiment, an apparatus may include an optical device configured to attach to a tensioner, a light source coupled to the optical device, and a processing unit coupled to the light source. The processing unit may be configured to perform the steps comprising transmitting a light signal into an optical device attached to a tensioner, receiving a reflected signal from the optical device attached to the tensioner, determining a change of wavelength in the reflected signal, and calculating a strain on the tensioner at the optical device based, at least in part, on the change in wavelength.

According to yet another embodiment, an apparatus includes a first means for measuring strain on a tensioner and a means for processing the measured strain to predict failure of the tensioner, the processing means coupled to the first measuring means.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

This disclosure presents systems and methods for measuring and recording loads on a marine riser tensioner. For example, a system and method is disclosed that, using an optical Fiber Bragg Grating (FBG) sensor or a resistive strain gauge sensor, may accurately measure tensioner loads and compare measurements of tensioner loads to nominal expected performances based on past measurements to forecast when the tensioner should be serviced. The systems and method may reduce uncertainty in a marine riser tensioner system and may allow failure prediction of marine riser tensioner equipment.

Marine drilling vessels may employ a variety of riser tensioners, such as direct-acting riser tensioners and wire-line riser tensioners. Direct-acting riser tensioners couple the vessel directly to the marine drilling riser, which may create a 1:1 relationship. For example, one foot of drilling vessel movement may result in one foot of hydraulic cylinder movement. Wire-line riser tensioners may couple the vessel to the drilling riser via a length of wire rope stretched over a series of sheaves supported by a hydraulic cylinder. As the vessel moves, the cylinder rod may extend and retract a fraction of that amount. Wire-line installations may be arranged such that 4 line parts are supported by 1 rod, which may create a 4:1 relationship. For example, four feet of vessel movement may equate to 1 foot of rod travel. In another embodiment, marine drilling vessels may employ other riser tensioners, such as slip joint tensioners and electric tensioners. One skilled in the art will readily recognize that there are other riser tensioners that may be employed by marine riser drilling vessels without departing from this disclosure in spirit or scope.

Figure 1:
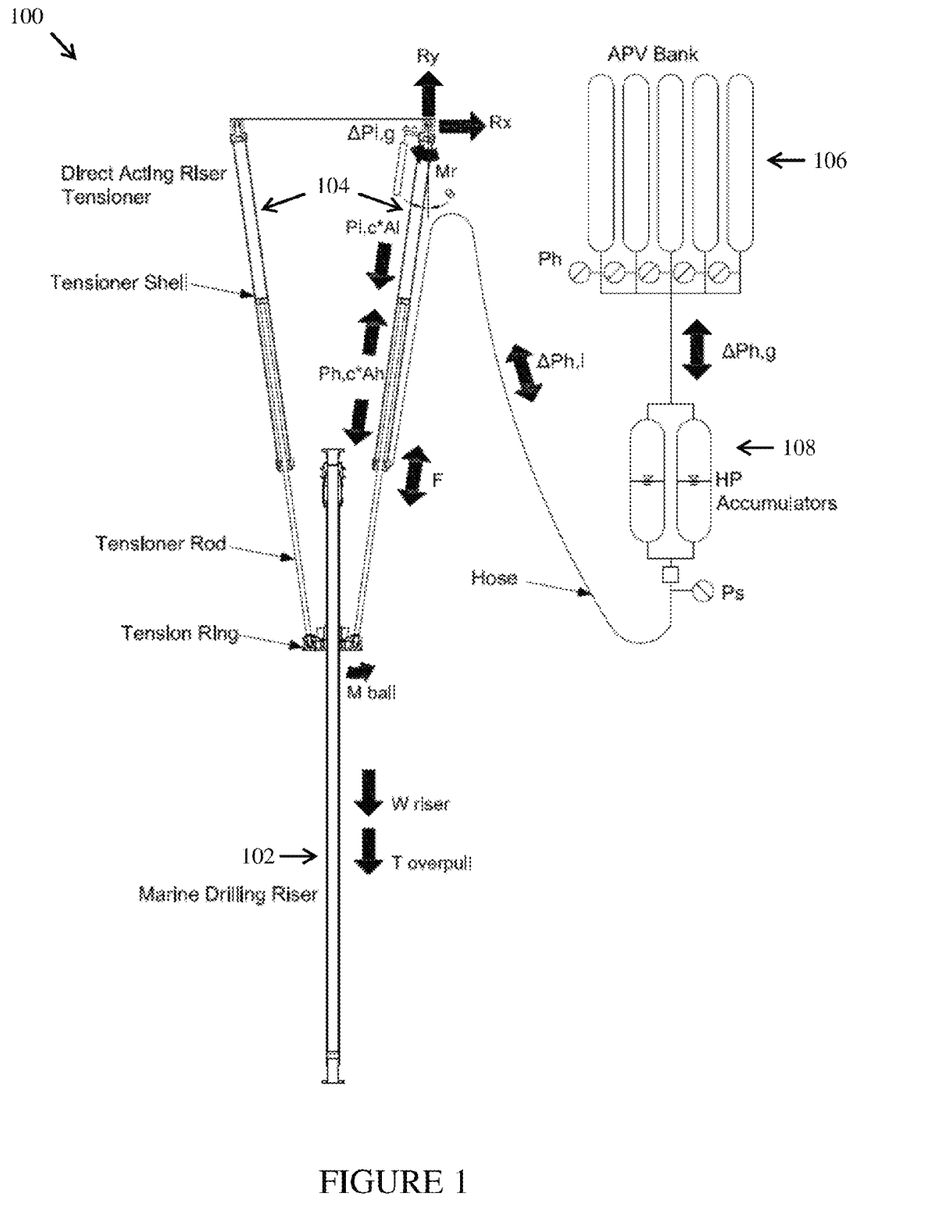
FIG. 1 is schematic block diagram illustrating a direct-acting riser tensioner system coupled to a marine drilling riser according to one embodiment of the disclosure.

FIG. 1 is schematic block diagram illustrating a direct-acting riser tensioner system 100 coupled to a marine drilling riser 102. The riser tensioners 104 may couple the vessel to the marine drilling riser 102, which may include a long length of vertical pipe and control conduits. The marine drilling riser 102 may be coupled to a subsea Blow-Out Preventer (BOP) on a well. Communication and control between the vessel and the well may be established through the drilling riser 102 and the BOP. The riser tensioners 104 may couple to a bank of Air Pressure Vessels (APV) 106 through a series of pipes, valves, and accumulator bottles 108. As the vessel moves, the riser tensioners 104 move, thereby expanding or contracting the coupled gas volume. The volume of gas, pressure, pipe arrangement, size, fittings, cylinder friction, and vessel motion may determine the magnitude of load variation of the riser tensioner 104 on the subsea equipment.

A mathematical model of the load variation of tension in a marine riser tensioner 104 may identify and define the different mechanisms influencing the load on a riser tensioner 104. FIG. 1 also presents a graphical representation of the loads and pressures in a marine riser tensioner system 100. A load, T, in a riser tensioner 104 may be a function of rod stroke, x, and pressure P, and may be described by the following equations:

$$T(x,P) = P_{h,c}A_h - P_{l,c}A_l - m_{pr}\ddot{x} - F(x)\text{sgn}(\dot{x}),$$

$$P_{h,c} = P_h(x) + \Delta P_{h,g}(\dot{x}) + \Delta P_{h,l}(\dot{x}), \text{ and}$$

$$P_{l,c} = P_l(x) + \Delta P_{l,g}(\dot{x}) + \Delta P_{l,l}(\dot{x}).$$

In the above equations, $P_{h,c}$ is the high pressure at the piston surface, $P_{l,c}$ is the low pressure at the piston surface, $m_{pr}$ is the mass of the piston rod, $\ddot{x}$ is the acceleration of the piston rod, $P_h$ is the gas pressure in the APVs 106 on the high pressure side of the piston, $\Delta P_{h,g}$ is the pressure loss due to fluid friction in the high pressure gas pipe work, $\Delta P_{h,l}$ is the pressure loss due to fluid friction in the high pressure liquid hydraulic pipe work and cylinder bore, $A_h$ is the area of the piston rod on the high pressure side, $P_l$ is the gas pressure on the low pressure side of the piston, $P_{l,g}$ is the pressure loss due to fluid friction in the low pressure gas pipe work, $\Delta P_{l,l}$ is the pressure loss due to fluid friction in the low pressure liquid hydraulic pipe work, $A_l$ is the area of the piston rod on the low pressure side, $F(x)$ is the friction in the system including piston seal assembly friction, rod seal assembly friction, and any sheave or internal friction of the wire rope and is a function of the rod stroke x, and x is the rod stroke, with increase in stroke equivalent to extending the rod, and decrease in stroke equivalent to retracting the rod. Both $P_h$ and $P_l$ contain the gas compressibility effects as a function of the cylinder rod stroke. The transient variation of riser tensioner 104 load, T, may be found by taking the derivative of the load, T, over time:

$$\frac{dT(x,P)}{dt} = \frac{d}{dt}(P_{h,c}A_h - P_{l,c}A_l - m_{pr}\ddot{x} - F(x)\text{sgn}(\dot{x})).$$

The transient tension variation may be described as a stiffness multiplied by the instantaneous velocity of the system, which after carrying out the derivatives and dropping small terms may yield:

$$\frac{dT(x,P)}{dt} = \left(A_h \frac{dP_{h,c}}{dx} - A_l \frac{dP_{l,c}}{dx} - \text{sgn}(\dot{x})\frac{dF(x)}{dx}\right)\dot{x}.$$

Various factors may influence the tension of the marine riser tensioner system 100, such as movement of a drilling riser 102 that is subject to forces from ocean currents and waves, long period oscillations that result from a dynamic positioning system of a drilling vessel continuously adjusting to the environment to maintain close proximity to the well, and riser tensioner 104 bending due to high accelerations and lateral loading. In addition, friction loads may amplify the marine drilling riser system 100 load variations. These load variations may transmit through the cylinder housing and structure of a riser tensioner 104 without influencing the system pressure. A simple pressure transducer will not detect these variations. Furthermore, pressure drops directly on the high pressure side cylinder bore of a liquid hydraulic system are not typically measured with a pressure transducer. A pressure transducer also does not measure the pressure losses attributable to the long hose and pipe runs, as well as entrance losses.

Figure 2:
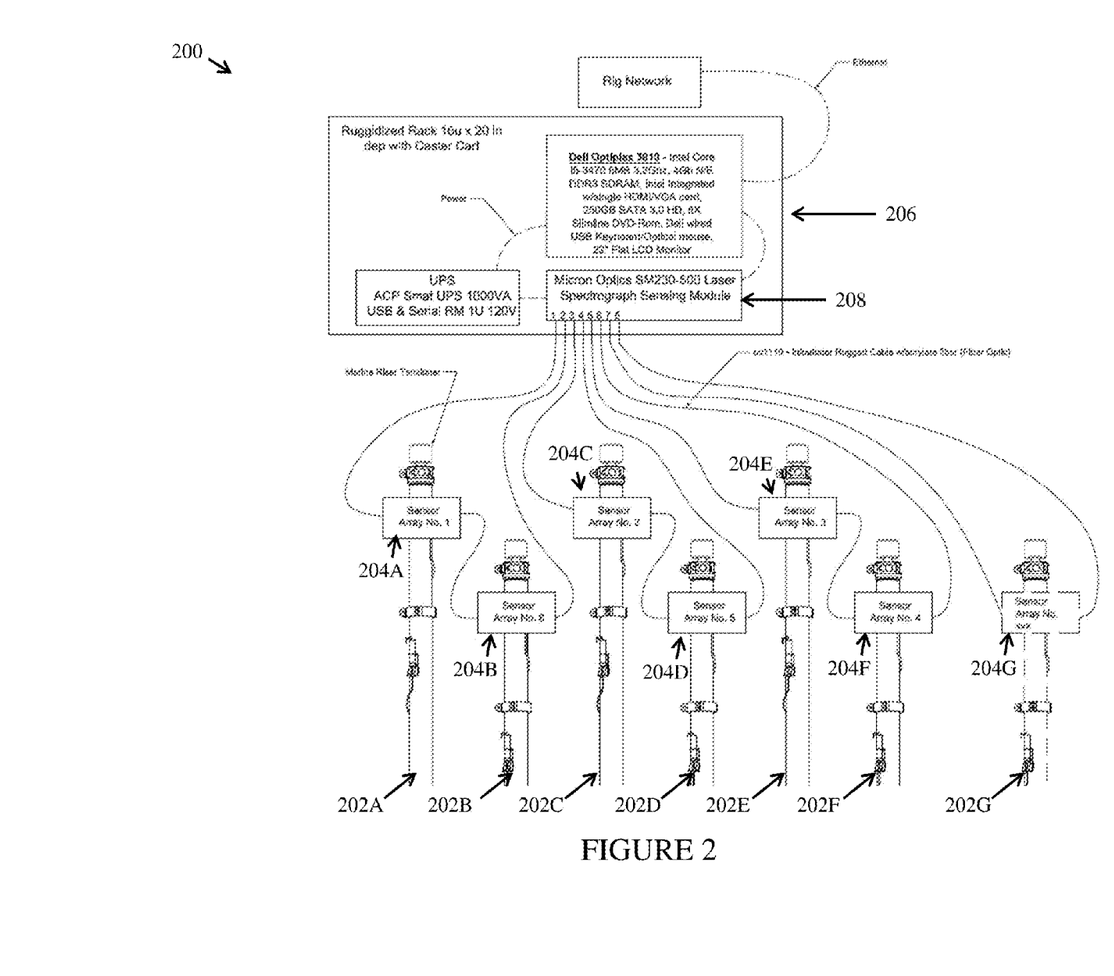
FIG. 2 is a schematic block diagram illustrating a tensioner strain measurement system according to one embodiment of the disclosure.

FIG. 2 is a schematic block diagram illustrating one embodiment of a tensioner load measurement system 200 that may account for the aforementioned factors that influence tensioner loading. The system 200 may include a marine riser tensioner 202A and a strain sensor 204A coupled to the tensioner 202A. The strain sensor 204A may include multiple sensors as part of an array of sensors. The system 200 may include additional marine riser tensioners 202 and strain sensors 204. One skilled in the art will readily recognize that various combinations of tensioners 202 and strain sensors 204 may be used without departing from the disclosure in spirit or scope. For example, the tensioners 202 may be a direct-acting riser tensioners, a wire-line riser tensioners, slip-joint tensioners, and/or electric tensioners.

According to a first embodiment, the strain sensor 204A may include an optical Fiber Bragg Grating (FBG), and may be configured to attach to the tensioner 202A to detect a change in the strain of the tensioner 202A. The FBG may include a diffraction grating for diffracting incoming light through the fiber. The diffraction may be proportional to a spacing between elements in the FBG, such that a change in length of the FBG changes the wavelength of diffracted light. The strain sensor arrays 204 may alternatively or additionally include a resistive strain gauge sensors.

The tensioner load measurement system 200 may include a processing unit 206 coupled to the strain sensor arrays 204 of the system 200. The processing unit 206 may reside in an enclosed safe environment with access to power and communications. The processing unit 206 may generate an electrical signal in response to the detected change in the strain of a tensioner 202A or a plurality of tensioners 202. The processing unit 206 may include a laser spectrograph 208 to generate the electrical signal in response to the detected change in the strain of a tensioner 202. In another embodiment, the processing unit 206 may include an electronic circuit to generate the electrical signal from a resistive strain sensor measurement when the strain sensor arrays 204 include a resistive strain sensor.

The processing unit 206 may also include hardware and/or software to calculate based, in part, on the generated electrical signal, a load on the tensioner 202. The hardware may include a hardware circuit, such as custom VLSI circuits or gate arrays, logic chips, transistors, or other discrete components. The hardware may also include programmable hardware devices such as field programmable gate arrays, programmable array logic, programmable logic devices, a controller, or the like.

Figure 3:
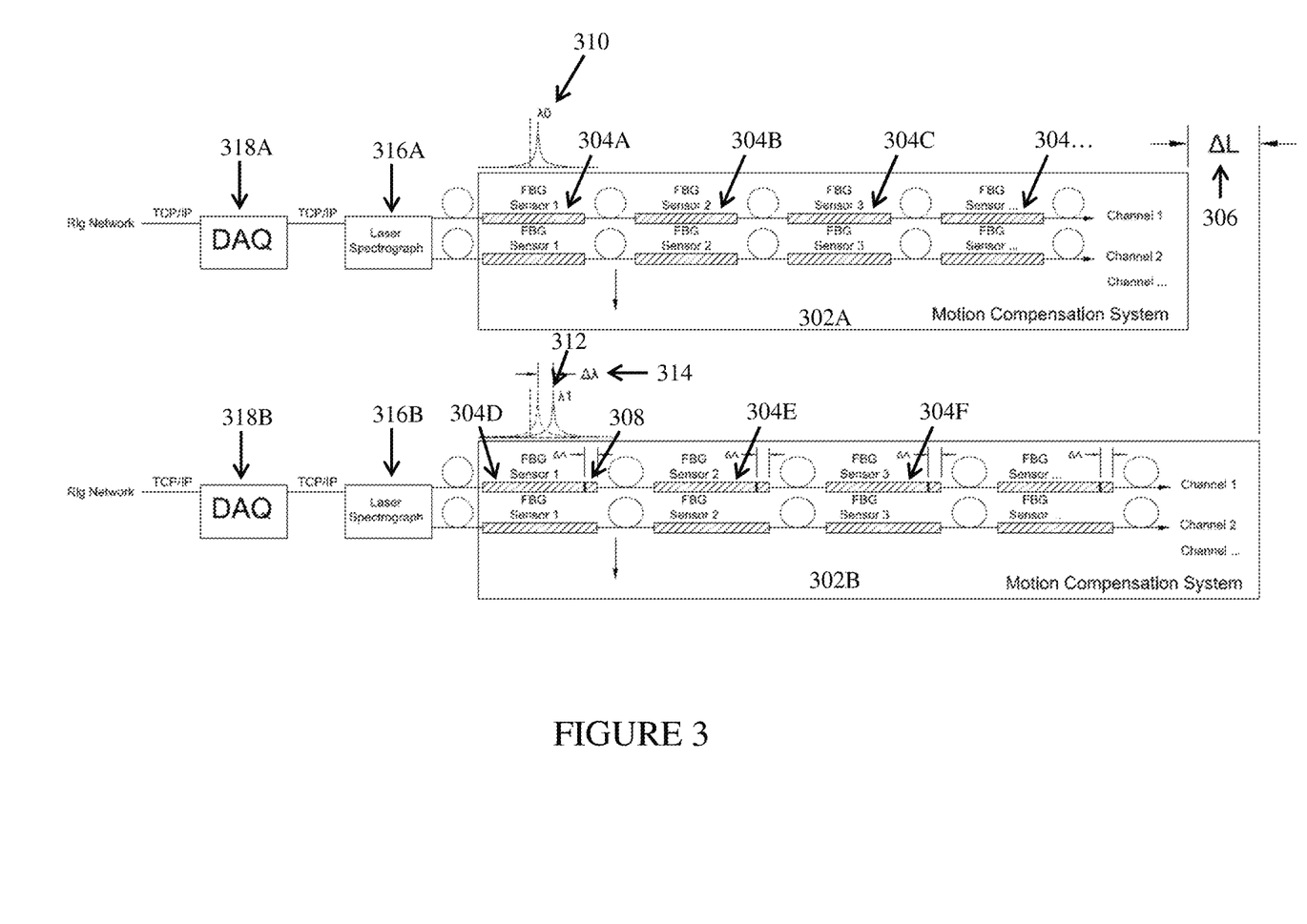
FIG. 3 is a schematic block diagram illustrating determining tensioner load measurement with optical Fiber Bragg Grating (FBG) according to one embodiment of the disclosure.

Numerous techniques may be employed to generate the electrical signal that may be processed with the hardware and/or software of the processing unit 206 to calculate a tensioner load. For example, FIG. 3 is a schematic block diagram illustrating how optical devices 304, such as FBGs, may be used in a system to determine tensioner loads. A change in length of a tensioner 302B may be detected by changes in wavelength of reflected light by the optical devices 304D, 304E, and 304F coupled to the tensioner 302B. Likewise, a change in length of a tensioner 302A may be detected by changes in wavelength of reflected light by the optical devices 304A, 304B, and 304C. Laser spectrographs 316A and 316B may be coupled to the optical devices 304A-C and 304D-F, respectively, for providing light and sensing reflected light signals. The laser spectrographs 316A and 316B may be coupled to data acquisition (DAQ) tools 318A, and 318B, respectively. The DAQs 318A and 318B may be coupled to a network, such as through a TCP/IP protocol, for reporting data. In one embodiment, a single laser spectrograph may be coupled to and multiplexed between the optical devices 304A-C and 304D-F. Likewise, the laser spectrographs 316A and 316B may share a single DAQ.

The frequency of light reflected by an optical FBG sensor 304A reflects is based on the Bragg wavelength:

$$\lambda_B = 2n_e \Lambda,$$

where $n_e$ is the effective refractive index of the grating material in a fiber core of the optical device 304A and $\Lambda$ is a grating period of the optical device 304A. The effective refractive index, otherwise known as mode index, depends on the propagation constant, $\beta$, and a wave number k. The effective refractive index, propagation constant, and wave number are related by:

$$n_e = \frac{\beta}{k}, \text{ and } k = \frac{2\pi}{\lambda}.$$

The change in Bragg frequency of an optical device 304 may depend on its change in length, L. Both strain and temperature change on a tensioner may induce length changes in an optical device 304A. In other embodiments, external pressure may also cause changes to the length of an optical device 304A. Excluding the effects from pressure, a total length of an optical device 304A may be given by:

$$\lambda_{Bragg}(L,T) = \lambda_{Bragg}(L) + \lambda_{Bragg}(T).$$

After some mathematical analysis and substitution of relevant relationships, it can be shown that strain, $\epsilon$, as a function of the change in light wavelength reflected may be represented by:

$$\varepsilon = \frac{\Delta\lambda_{Bragg}/\lambda_{Bragg}}{\mu L + 1} - \frac{(\xi + \alpha)}{\mu L + 1}\Delta T,$$

where $\alpha$ is a linear coefficient of thermal expansion of the tensioner 302A, $\xi$ is the measure of the change of the index of refraction with change in temperature, and $\mu$ is the linear strain-induced change in the material effective mode index.

The difference in the coefficient of thermal expansion (CTE) between a tensioner 302A and an optical device 304A may create a strain on the gauge represented by:

$$\epsilon_t = (CTE_1 - CTE_{FBG})\Delta T.$$

This strain may be subtracted from the measurement to determine the strain in the tensioner 302A. The final strain may therefore be represented by:

$$\varepsilon = \frac{\Delta\lambda_{Bragg}/\lambda_{Bragg}}{\mu L + 1} - \frac{(\xi + \alpha)}{\mu L + 1}\Delta T - (CTE_1 - CTE_{FBG})\Delta T.$$

As the optical device 304A changes length or temperature, the strain may increase. This is measurable by suitable equipment such as a laser spectrograph. The Bragg wavelength change is proportional to strain, after compensation for any change in temperature. A second optical device that is not influenced by strain may be placed at the location of measurement and used as a reference to compensate for temperature effects.

In another embodiment, a plurality of optical devices 304 may be used to determine the load on a tensioner. For example, the tensioner 302A and the tensioner 302B may each have optical devices 304 attached to perimeter circumference and parallel to a long axis. As the tensioner 302B stretches by a first delta amount 306 with respect to the tensioner 302A, the optical devices 304D-304F coupled to the tensioner 302B stretch by a second delta amount 308. The stretching by the second delta amount 308 may cause the Bragg wavelength for each of the optical devices 304D-304F coupled to the second test specimen 302B to shift from the initial wavelength 310 to the second wavelength 312. The delta wavelength amount 314 may be detected by the laser spectrograph 316B.

The shift in the Bragg wavelength of delta wavelength 314 may generate an electrical signal at the laser spectrograph 316B that is proportional to the delta wavelength 314 and change in length of the tensioner 302B. For example, a spectrograph 316 may process light passing through the optical devices 304 to determine the change in wavelength of reflected light from the optical devices 304 attached to tensioners 302. A spectrograph 316A processing light passing through the optical devices 304A-304C coupled to the first tensioner 302A may determine that there is no change in frequency reflected, while a spectrograph 316B processing light passing through the optical devices 304D-304F coupled to the second tensioner 302B may determine that there was a change in frequency reflected that is proportional to the delta wavelength amount 314. Based, at least in part, on the determined change in frequency reflected, the spectrograph 316B may generate an electrical signal representative of the change in the reflected wavelength, which is also representative of the change in length of the second tensioner 302B. In one embodiment, a data acquisition unit (DAQ) 318 may process the generated electrical signal and record the measured strain determined from the change in frequency reflected by the optical devices 304. The data acquisition unit 318 and the spectrograph 316 may be incorporated into a single processing unit 206, such as a rack unit.

Figure 4:
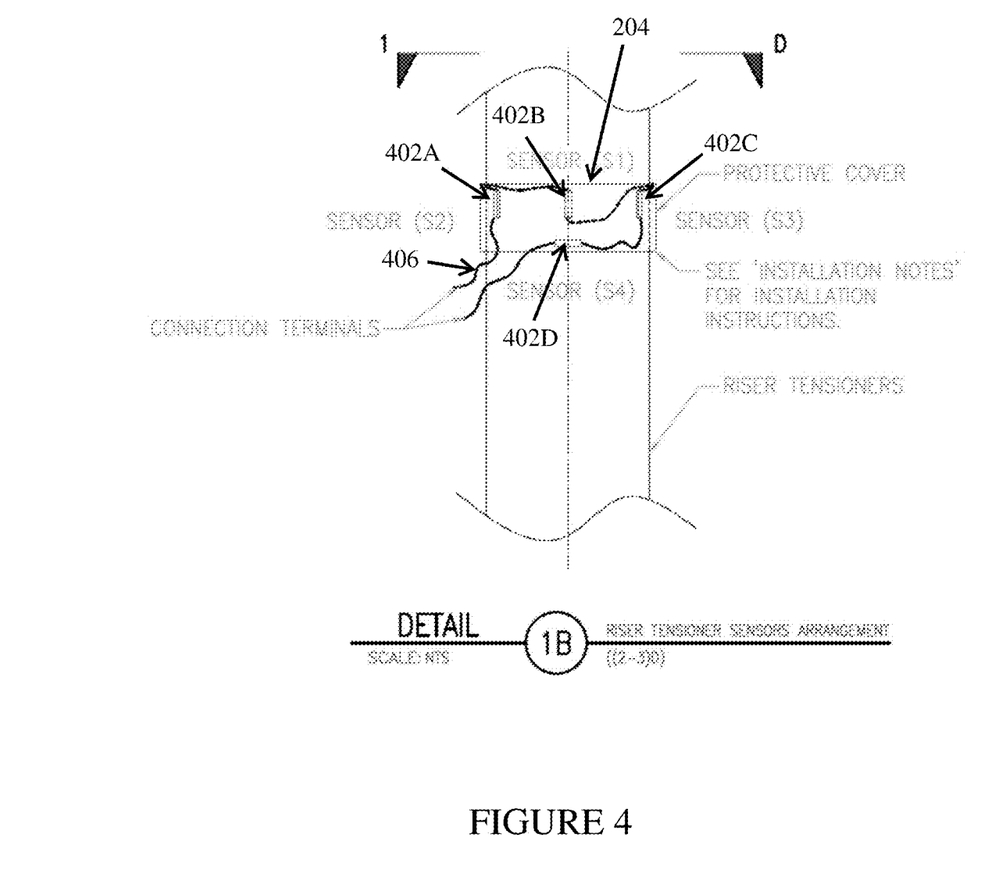
FIG. 4 is a schematic block diagram illustrating a side view of a sensor array for a tensioner according to one embodiment of the disclosure.

Sensors may be arranged on a tensioner in various arrangements. FIG. 4 is a schematic block diagram illustrating a side view of a strain sensor array 204 on a tensioner according to one embodiment. The strain sensor array 204 may include three axial strain sensors 402A-402C and one circumferential hoop strain sensor 402D placed on each tensioner cylinder. The strain sensors 402A-C may be arranged approximately equally around a circumference of the tensioner and aligned along the long axis of the tensioner. The strain sensor 402D may be arranged perpendicular to the long axis of the tensioner and offset along the long axis of the tensioner from the sensors 402A-C. Furthermore, multiple sensor arrangements other than the one disclosed in FIG. 4 are possible without departing from this disclosure in spirit or scope, with each arrangement providing distinct benefits.

Each of the strain sensors 402 may be located on the cylinder shell of a tensioner 202. In one embodiment, the strain sensors 402 may be secured to the cylinder shell with a low-heat tack. An epoxy coating on the strain sensors 402 that is similar to the coating used for the tensioners 202 may be used to protect the strain sensors 402 from the marine atmosphere.

Each of the strain sensors 402 may be coupled to one another via a communication wire 406 that couples the strain sensors 402 in parallel or in series. In one embodiment, the strain sensors 402 are coupled in series. The communication wire 406 may be, for example, an optical fiber or an electrically-conductive wire, such as copper, aluminum, or the like. The strain sensors 402 may alternatively be coupled to each other through wireless communications techniques known in the art.

Figure 5:
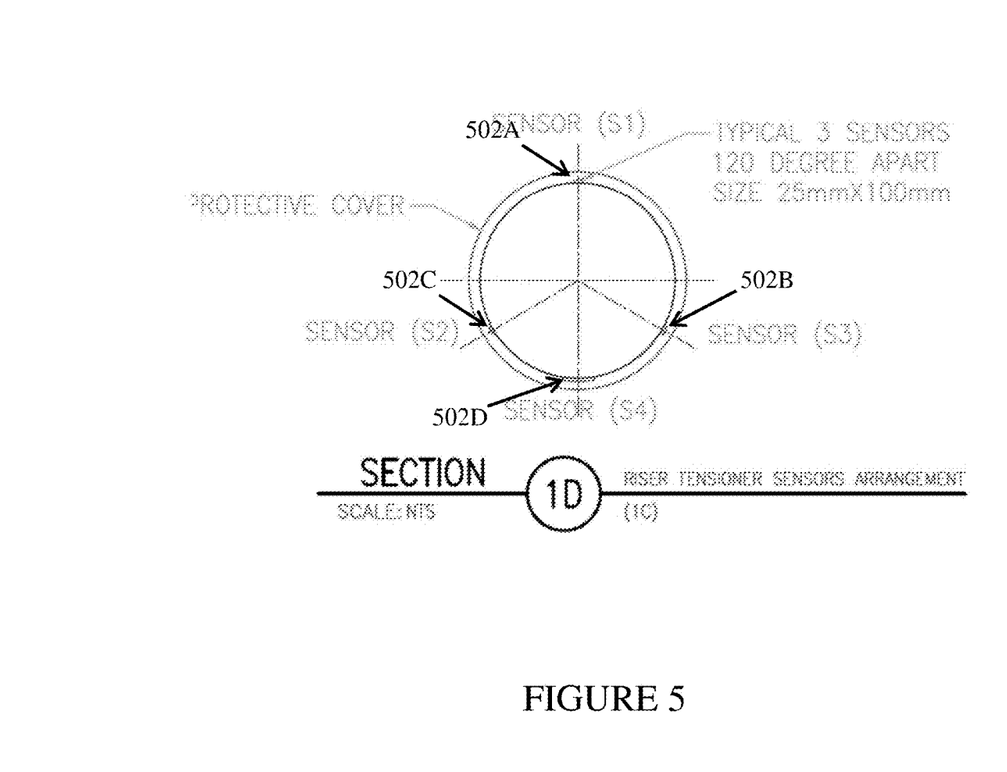
FIG. 5 is schematic block diagram illustrating a plan view of a sensor array for a tensioner according to one embodiment of the disclosure.

FIG. 5 is schematic block diagram illustrating a plan view of the sensor array arrangement disclosed in FIG. 4. In one embodiment, three axial strain sensors 502A-502C may be separated by 120 degrees along the perimeter of the tensioner, and a circumferential strain sensor 502D may be separated from two adjacent axial strain sensors by 60 degrees.

Figure 6:
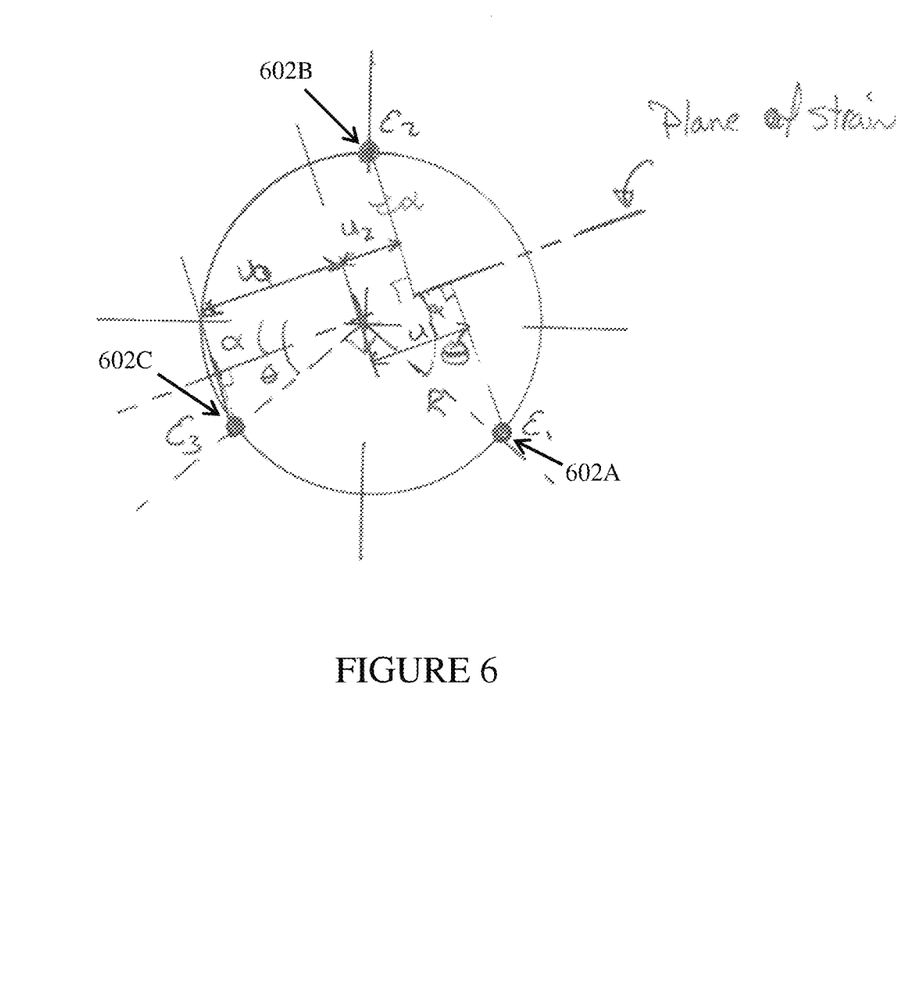
FIG. 6 is a graphical diagram illustrating an arrangement of axial strain gauges and their relationship to the plane of maximum strain according to one embodiment of the disclosure.

A graphical diagram may be used to illustrate one embodiment of how loads on a tensioner may be calculated. For example, FIG. 6 is a graphical diagram illustrating an arrangement of axial strain gauges and their relationship to the plane of maximum strain according to one embodiment. Three axial strain sensors orientated parallel to the long axis of the tensioner and arranged approximately 120 degrees apart at locations 602A, 602B, and 602C may measure bending and axial strains. A strain, $\epsilon$, may be defined at a location, u, on a plane of maximum bending strain. The plane of maximum strain may be related to the orientation of the location of measurement, e.g., the position of the cylinders, by an angle, $\alpha$. The position of the sensors may be defined by the angle, $\theta$, and distance, R, from a center. Knowing this information, one may determine the orientation of the plane such that $\epsilon_1$, $\epsilon_2$, and $\epsilon_3$ fall on a linear curve. For example, as the plane of strain rotates relative to the sensors, there may be a point where the sensor measurements align on a curve. Defining $\epsilon_1$, $\epsilon_2$, $\epsilon_3$, $u_1$, $u_2$, and $u_3$ as in FIG. 6, the relationship of the plane of maximum strain, $\alpha$, to the orientation of the sensors, $\theta$, may be found. The linear relationship of strain on the plane may be stated as follows:

$$\frac{\varepsilon_1 - \varepsilon_3}{u_1 - u_3} = \frac{\varepsilon_2 - \varepsilon_3}{u_2 - u_3}.$$

The position, u, of the measured strain on the plane of maximum strain may be related by the radius of the strain gauge from the center of the plane and angular displacement of the plane of maximum strain from the angular location of the sensor. The following three equations illustrate how each sensor may relate to the plane of maximum strain:

$$u_1 = R\cos(\theta + \alpha)$$

$$u_2 = R\sin(\alpha), \text{ and}$$

$$u_3 = -R\cos(\theta - \alpha)$$

The relationships for the position of the measured strain on the plane of maximum strain may be substituted into the equation describing the linear behavior of strain of the component, which may yield:

$$\frac{\varepsilon_1 - \varepsilon_3}{\varepsilon_2 - \varepsilon_3} = \frac{\cos(\theta + \alpha) + \cos(\theta - \alpha)}{\sin(\alpha) + \cos(\theta - \alpha)}.$$

The numerical solution of the previous equation for $\alpha$ may determine the angular displacement of the plane of maximum strain from the sensor orientation. The maximum strain may be determined by:

$$\varepsilon_{max} = (\varepsilon_1 - \varepsilon_3) \cdot \frac{1 + \cos(\theta - \alpha)}{\cos(\theta + \alpha) + \cos(\theta - \alpha)} + \varepsilon_3.$$

Similarly, the minimum strain may be given by:

$$\varepsilon_{min} = \varepsilon_1 - (\varepsilon_1 - \varepsilon_3) \cdot \frac{1 + \cos(\theta - \alpha)}{\cos(\theta + \alpha) + \cos(\theta - \alpha)}.$$

The calculated strains may be converted to stresses and loads on the tensioner. For example, the axial stress may be calculated from the sensor strains, $\epsilon$, by:

$$\sigma_a = \frac{E}{1 - v^2}(\varepsilon_a + v\varepsilon_h),$$

where the Young's modulus of the material is E, (~30e6 psi for alloy steel), v is Poisson's ratio of the material, (~0.283 for alloy steel), and $\epsilon_a$ and $\epsilon_a$ are the measured axial and hoop strains, respectively. The average load in the tensioner cylinder, T, may be calculated by multiplying the average stress by the cylinder shell cross-sectional area, $A_c$ to yield:

$$T = \sigma_a A_c.$$

The bending stress in the cylinder may be determined from the maximum and minimum stresses measured to yield:

$$\sigma_b = \frac{(\sigma_{max} - \sigma_{min})}{2}.$$

Knowing the geometry of the cylinder, the moment of inertia, I, and outer fiber, c, and the bending moment or torque, M, on the tensioner, may be calculated by:

$$M = \sigma_b \frac{I}{c}.$$

Figure 7:
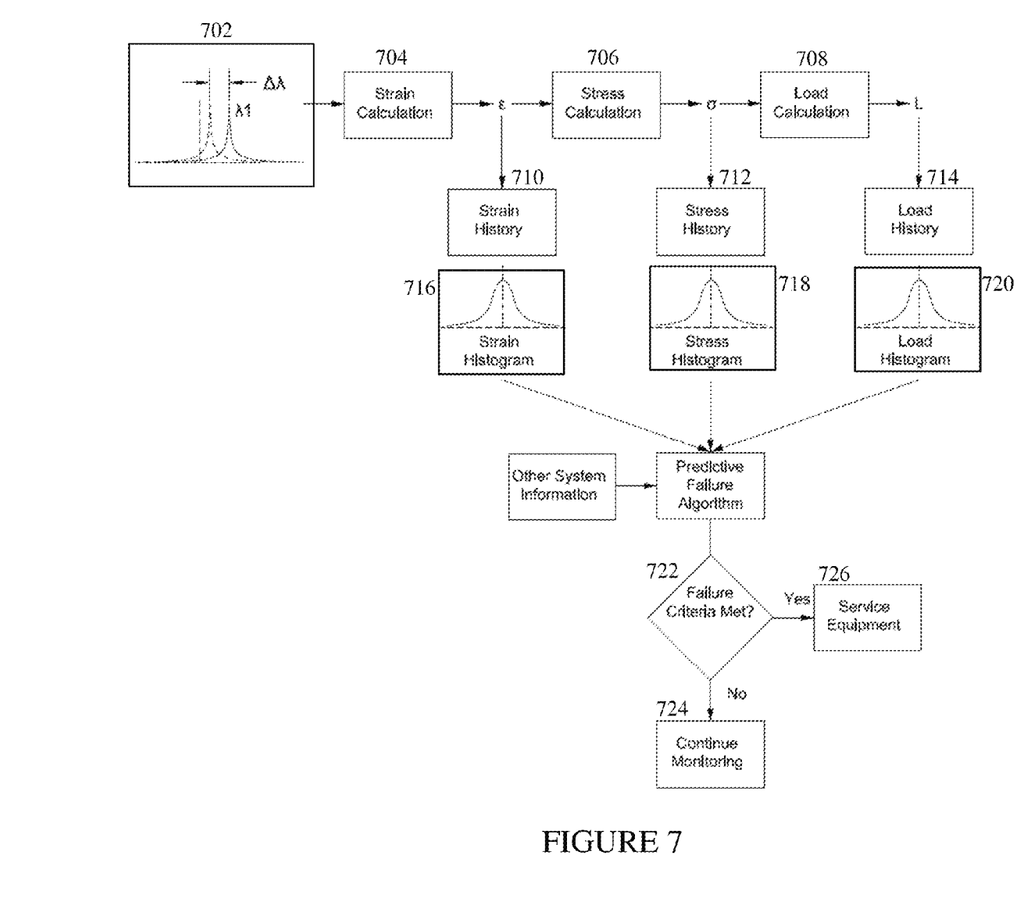
FIG. 7 is a flow chart diagram illustrating a method for determining the condition of a tensioner according to one embodiment of the disclosure.

FIG. 7 is a flow chart diagram illustrating a method for determining the condition of a tensioner according to one embodiment of the disclosure. In particular, FIG. 7 illustrates that the wavelength measurement may be converted to stress, strain, and load values for use in a predictive failure algorithm. The predictive failure algorithm may also compare current values to stored information of the previous stress, strain, and load values. In one embodiment, other physical parameters of interest calculated for a tensioner may be used for the predictive model. For example, the hysteresis of a tensioner that results from seal friction, gas compressibility, and/or fluid flow friction may be calculated to determine the condition of the tensioner.

At block 702, the strain of a tensioner may be detected by measuring a change in a wavelength of reflected light from an optical device. A processing unit may calculate a strain based, at least in part, on a change in wavelength at block 702. At block 706, a stress may be calculated based, at least in part, on the strain calculation, and at block 708, a load may be calculated based on the strain and/or stress calculation. The processing unit 206 may be coupled to a memory, and may store the calculated strain in the memory at block 710, store the calculated stress in the memory at block 712, and/or store the load calculations in the memory at block 714.

The processing unit 206 may calculate a quantitative condition value representative of the stored tensioner load and at least one previously-stored tensioner load. For example, the processing unit 206 may process the stored calculated value of the tensioner load and at least one previously-stored value for the tensioner load to determine a standard deviation for the tensioner load. Other parameters, such as an average, maximum, minimum, or the like may be calculated based on stored values for the calculated strain, stress, load, or the like.

The processing unit 206 may process the stored values for the strain, stress, or load to normalize their measurements per the environment in which the measurements were made in order to account for load variation effects, such as velocity and volume. Normalization routines may include methods of comparing load measurements to other sensor measurements, such as heave, and measurements that extend for a sufficient length of time. The normalized values may be further processed to determine a strain histogram at block 716, a stress histogram at block 718, and a load histogram at block 720. The processed information about the stress, strain, and load, as well as other system information, may be used as input to a predictive failure algorithm executable by the processing unit. At block 722, the calculated quantitative condition value may be compared to a threshold, and based on the result of the comparison, a condition of the tensioner may be determined.

Figure 8:
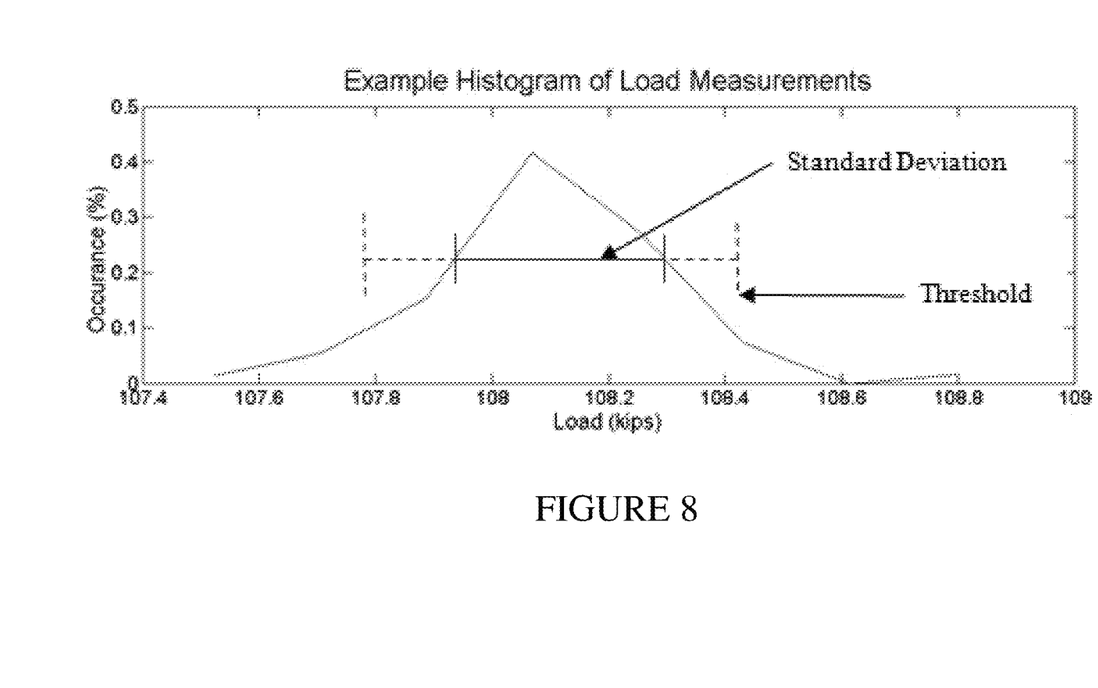
FIG. 8 is a graph illustrating a result of analysis of measured tensioner loads according to one embodiment of the disclosure.

FIG. 8 is a graph illustrating a result of analysis of measured tensioner loads according to one embodiment. In particular, FIG. 8 illustrates an example histogram of load measurement data, standard deviation, and a hysteresis threshold. The standard deviation may be representative of the hysteresis in a tensioner system, and may be based on a plurality of recorded tensioner load measurements. The relationship between the standard deviation and a hysteresis threshold may provide some indication as to the condition of the tensioner system. For example, based on the history of calculated tensioner strain, stress, and/or load, a hysteresis threshold may be determined to provide a boundary for what may be considered a tensioner system in good or bad condition.

In one embodiment, the calculated quantitative condition value may be a standard deviation of a collection of previously-stored tensioner load values. The standard deviation may then be compared to the hysteresis threshold to determine the condition of the tensioner system. For example, if the standard deviation is within the bounds of the hysteresis threshold, it may be determined, at block 724, that the tensioner is in good condition and therefore monitoring of the tensioner system may continue. If the standard deviation is outside the bounds of the hysteresis threshold, it may be determined, at block 726, that the tensioner is in bad condition, which indicates that the tensioner requires maintenance. The standard deviation may also be plotted as a function of time to illustrate the life cycle of a tensioner.

Figure 9:
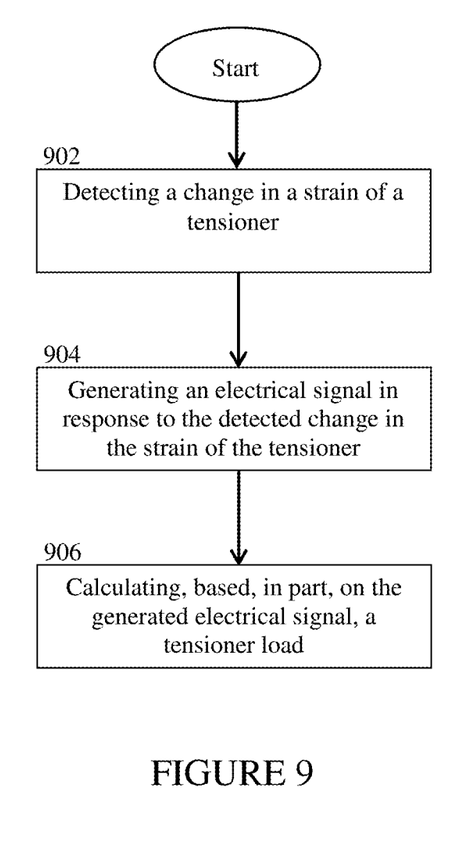
FIG. 9 is a flow chart illustrating a method for determining a load of a tensioner according to one embodiment of the disclosure.

FIG. 9 is a flow chart illustrating a method for determining a load of a tensioner according to one embodiment of the disclosure. At block 902, a change in a strain of a tensioner may be determined. At block 904, an electrical signal may be generated in response to the detected change in the strain of the tensioner. At block 906, a tensioner load may be calculated based, in part, on the generated electrical signal.

Figure 10:
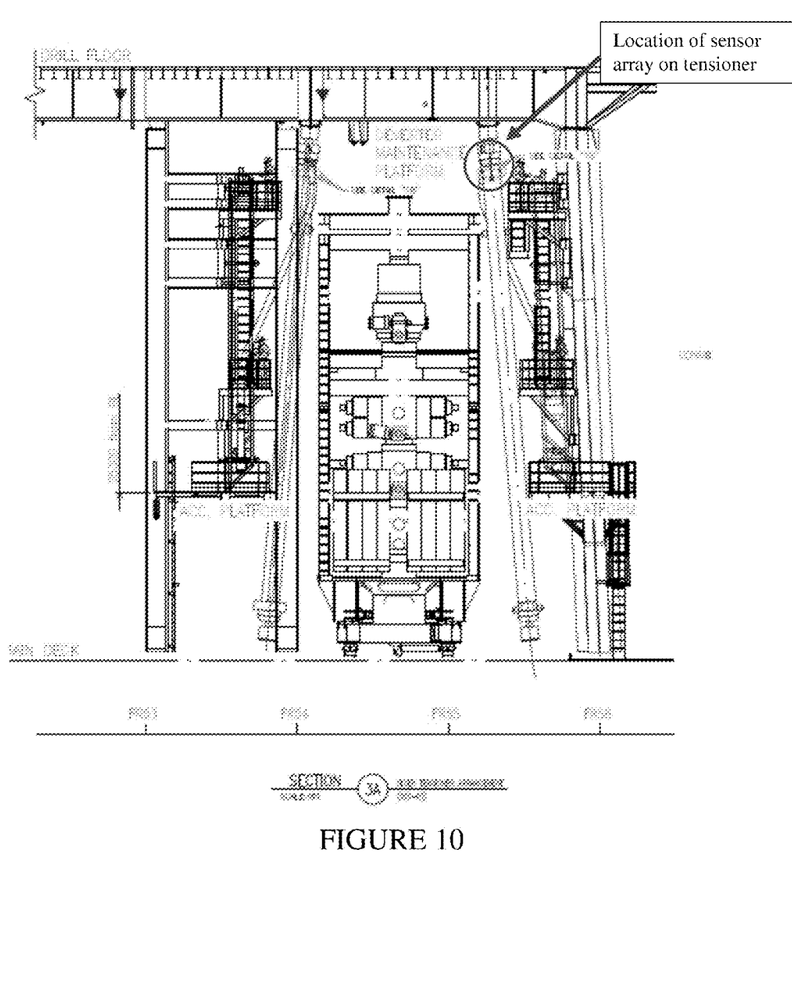
FIG. 10 is a schematic block diagram illustrating a sensor array for a riser tensioner installed on a drilling vessel according to one embodiment of the disclosure.

FIG. 10 is a schematic block diagram illustrating a sensor array arrangement on a riser tensioner installed on a drilling vessel according to one embodiment of the disclosure. In particular, FIG. 10 illustrates a location for the strain sensor arrays of a tensioner load measurement system in relation to other drilling riser equipment.

Figure 11:
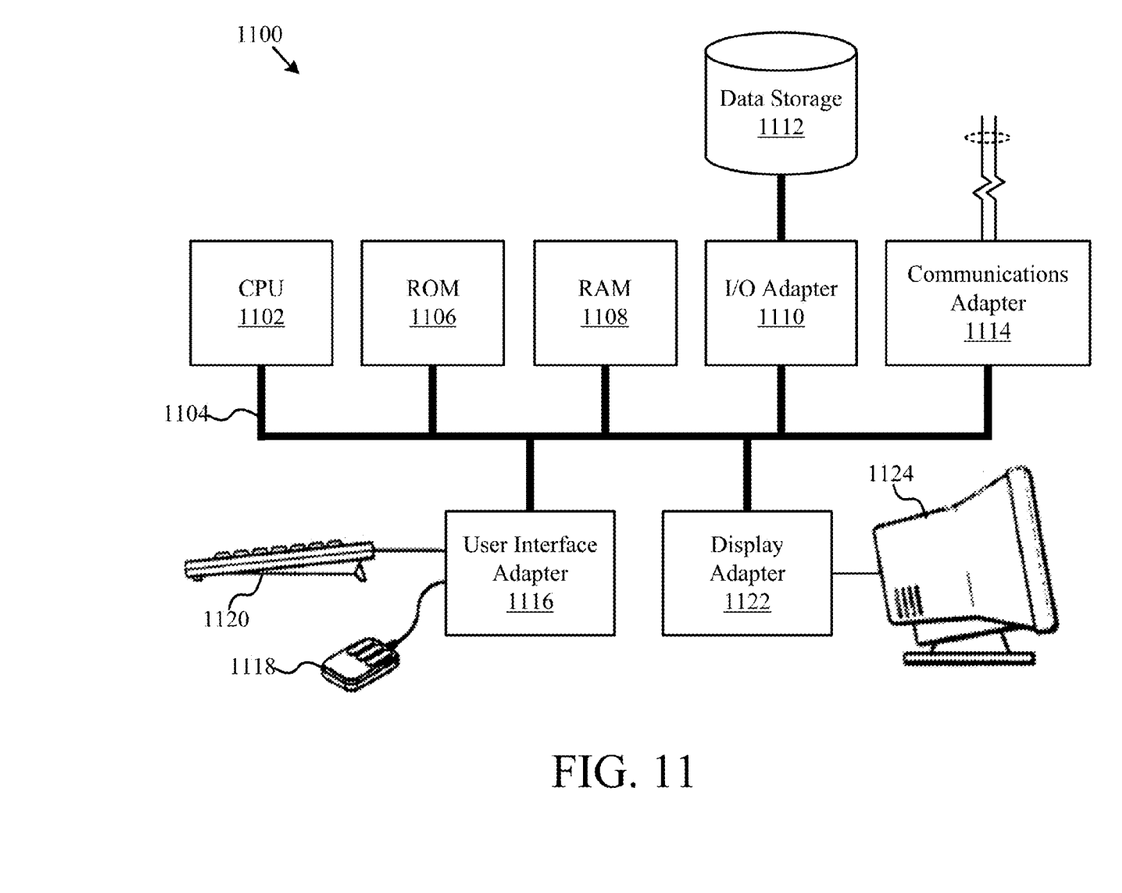
FIG. 11 is a block diagram illustrating a computer system according to one embodiment of the disclosure.

FIG. 11 illustrates a computer system 1100 adapted according to certain embodiments as a server and/or a user interface device for processing and/or displaying data from the processing unit of FIG. 2. The central processing unit (CPU) 1102 is coupled to the system bus 1104. The CPU 1102 may be a general purpose CPU or microprocessor, graphics processing unit (GPU), and/or microcontroller. The present embodiments are not restricted by the architecture of the CPU 1102 so long as the CPU 1102, whether directly or indirectly, supports the modules and operations as described herein. The CPU 1102 may execute the various logical instructions according to the present embodiments, such as the method illustrated in FIG. 9.

The computer system 1100 also may include random access memory (RAM) 1108, which may be synchronous RAM (SRAM), dynamic RAM (DRAM), and/or synchronous dynamic RAM (SDRAM). The computer system 1100 may utilize RAM 1108 to store the various data structures used by a software application, such as information received from the strain sensor arrays. The computer system 1100 may also include read only memory (ROM) 1106 which may be PROM, EPROM, EEPROM, optical storage, or the like. The ROM may store configuration information for booting the computer system 1100. The RAM 1108 and the ROM 1106 may hold user and system data.

The computer system 1100 may also include an input/output (I/O) adapter 1110, a communications adapter 1114, a user interface adapter 1116, and a display adapter 1122. The I/O adapter 1110 and/or the user interface adapter 1116 may, in certain embodiments, enable a user to interact with the computer system 1100. In a further embodiment, the display adapter 1122 may display a graphical user interface (GUI) associated with a software or web-based application on a display device 1124. For example, the display adapter 1122 may display an interface for monitoring tensioner strain and/or condition.

The I/O adapter 1110 may couple one or more storage devices 1112, such as one or more of a hard drive, a flash drive, a compact disc (CD) drive, a floppy disk drive, and a tape drive, to the computer system 1100. The communications adapter 1114 may be adapted to couple the computer system 1100 to a network, which may be one or more of a LAN, WAN, and/or the Internet. The user interface adapter 1116 couples user input devices, such as a keyboard 1120, a pointing device 1118, and/or a touch screen (not shown) to the computer system 1100. The display adapter 1122 may be driven by the CPU 1102 to control the display on the display device 1124.

The applications of the present disclosure are not limited to the architecture of computer system 1100. Rather, the computer system 1100 is provided as an example of one type of computing device that may be adapted to perform the functions of a server and/or a user interface device. For example, any suitable processor-based device may be utilized including, without limitation, personal data assistants (PDAs), tablet computers, smartphones, computer game consoles, and multi-processor servers. Moreover, the systems and methods of the present disclosure may be implemented on application-specific integrated circuits (ASIC), very large scale integrated (VLSI) circuits, or other circuitry. In fact, persons of ordinary skill in the art may utilize any number of suitable structures capable of executing logical operations according to the described embodiments.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions, and alterations can be made herein without departing from the spirit and scope of the disclosure as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the present disclosure, machines, manufacture, compositions of matter, means, methods, or steps presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:
1. A method, comprising:
 transmitting, from a first light source, a light signal into a first optical device attached to a tensioner;
 receiving, by a processing unit, a reflected signal from the first optical device;

determining, by the processing unit, a change of wavelength in the reflected signal;
calculating, by the processing unit, a strain on the tensioner at the first optical device based, at least in part, on the change in wavelength;
calculating, by the processing unit, a load based, at least in part, on the calculated strain;
calculating, by the processing unit, a condition value based, at least in part, on the calculated tensioner load and at least one previously-calculated load;
comparing, by the processing unit, the condition value to a threshold;
determining, by the processing unit, the condition of the tensioner based, at least in part, on the result of the comparison step; and
applying a predictive model to predict failures of the tensioner based on the calculated load and the previously-calculated load,
in which the first optical device, a second optical device, and a third optical device are configured to attach at approximately an equal spacing around a circumference of the tensioner aligned along a long axis of the tensioner,
in which a fourth optical device is configured to attach perpendicular to the long axis of the tensioner, and
in which a second light source is coupled to the second optical device.

2. The method of claim 1, in which the steps of transmitting light and receiving a reflected signal comprise:
transmitting a light signal into a Fiber Bragg Grating (FBG) attached to the tensioner; and
receiving a reflected signal from the Fiber Bragg Grating attached to the tensioner.

3. The method of claim 1, in which the calculated load comprises at least one of an axial load on the tensioner, a bending load on the tensioner, and a torsional load on the tensioner.

4. The method of claim 1, further comprising:
transmitting a second light signal into the second optical device attached to the tensioner;
receiving a second reflected signal from the second optical device attached to the tensioner;
determining a second change of wavelength in the second reflected signal;
calculating a second strain on the tensioner at the second optical device based, at least in part, on the second change in wavelength; and
calculating a load on the tensioner based, at least in part, on the first strain and the second strain.

5. The method of claim 1, wherein the step of calculating the condition value is also based, at least in part, on a hysteresis of the tensioner.

6. An apparatus, comprising:
a first optical device configured to attach to a tensioner;
a second optical device configured to attach to the tensioner;
a third optical device configured to attach to the tensioner;
a fourth optical device configured to attach to the tensioner;
a first light source coupled to the first optical device;
a second light source coupled to the second optical device; and
a processing unit coupled to the first light source, in which the processing unit is configured to perform the steps comprising:
transmitting a light signal into the first optical device attached to the tensioner;
receiving a reflected signal from the first optical device attached to the tensioner;
determining a change of wavelength in the reflected signal;
calculating a strain on the tensioner at the first optical device based, at least in part, on the change in wavelength;
calculating a load based, at least in part, on the calculated strain;
calculating a condition value based, at least in part, on the calculated tensioner load and at least one previously-calculated load;
comparing the condition value to a threshold;
determining the condition of the tensioner based, at least in part, on the result of the comparison step; and
applying a predictive model to predict failures of the tensioner based on the calculated load and the previously-calculated load,
in which the first optical device, the second optical device, and the third optical device are configured to attach at approximately an equal spacing around a circumference of the tensioner aligned along a long axis of the tensioner, and
in which the fourth optical device is configured to attach perpendicular to the long axis of the tensioner.

7. The apparatus of claim 6, in which the first optical device comprises a Fiber Bragg Grating (FBG).

8. The apparatus of claim 6, in which the first light source comprises a laser spectrograph.

9. The apparatus of claim 6, in which the processing unit is further configured to perform the steps comprising:
calculating a stress based, at least in part, on the calculated strain.

10. The apparatus of claim 9, in which the calculated load comprises at least one of an axial load on the tensioner, a bending load tensioner, and a torsional load on the tensioner.

11. The apparatus of claim 6, in which the processing unit is further configured to:
store a calculated tensioner stress in a memory;
store a calculated tensioner load in the memory;
determine the condition of the tensioner based, at least in part, on the calculated tensioner stress, the calculated tensioner load, and the condition value.

12. The apparatus of claim 6, in which the processing unit is further configured to calculate the condition value based, at least in part, on a hysteresis.

* * * * *